United States Patent
Lian et al.

(10) Patent No.: US 7,144,183 B2
(45) Date of Patent: Dec. 5, 2006

(54) LOCK WITH INTERNAL RETAINER

(75) Inventors: Aaron B. Lian, Beaverton, OR (US);
Christopher M. Carpenter, Tualatin, OR (US); Emory D. Hungerford, deceased, late of Yachats, OR (US); Lorraine R. Hungerford, legal representative, Yachats, OR (US); Ray J. Morris, Boring, OR (US)

(73) Assignee: ESCO Corporation, Portland, OR (US)

( * ) Notice: Subject to any disclaimer, the term of this patent is extended or adjusted under 35 U.S.C. 154(b) by 142 days.

(21) Appl. No.: 10/615,740

(22) Filed: Jul. 8, 2003

(65) Prior Publication Data

US 2004/0037637 A1 Feb. 26, 2004

Related U.S. Application Data

(63) Continuation of application No. 09/900,834, filed on Jul. 6, 2001, now abandoned.

(51) Int. Cl.
*F16B 21/16* (2006.01)

(52) U.S. Cl. ............... 403/319; 403/317; 403/318; 37/455; 37/456; 37/458; 172/772

(58) Field of Classification Search ............... 37/455, 37/456, 458; 403/317–319; 172/772
See application file for complete search history.

(56) References Cited

U.S. PATENT DOCUMENTS

| | | | |
|---|---|---|---|
| 685,555 A | 10/1901 | Ashby et al. | 403/294 |
| 1,776,133 A | 9/1930 | Prindle | 403/294 |
| 1,960,405 A | 5/1934 | Amor | 403/292 |
| 3,104,757 A | 9/1963 | Dougherty et al. | 403/294 |
| 3,268,260 A | 8/1966 | Snipe | 403/355 |
| 3,360,285 A | 12/1967 | Huckshold | 403/292 |
| 3,365,220 A | 1/1968 | Rusche | 403/292 |
| 3,640,557 A | 2/1972 | Nute et al. | 403/294 |
| 3,826,024 A | 7/1974 | Peterson | 37/142 A |
| 3,952,433 A | 4/1976 | Heinold et al. | 37/457 |
| 4,045,927 A | 9/1977 | Diaz | 403/292 |
| 4,317,300 A | 3/1982 | Emrich et al. | 37/142 R |
| 4,367,602 A | 1/1983 | Peterson | 37/142 A |
| 4,443,041 A | 4/1984 | Wohlford | 305/43 |
| 4,505,058 A | 3/1985 | Peterson | 37/142 A |
| 4,587,751 A | 5/1986 | Sjogren et al. | 37/142 R |
| 4,602,445 A | 7/1986 | Nilsson | 37/457 |
| 4,663,867 A * | 5/1987 | Hahn et al. | 37/459 |
| 4,688,008 A | 8/1987 | Pollard et al. | 403/297 |

(Continued)

FOREIGN PATENT DOCUMENTS

EP 566296 A1 10/1993

OTHER PUBLICATIONS

Keech Castings Australia Pty Limited Moonlock Assembly Details, Mar. 1987, 7 pages.

*Primary Examiner*—Daniel P. Stodola
*Assistant Examiner*—Michael P. Ferguson
(74) *Attorney, Agent, or Firm*—Steven P. Schad

(57) ABSTRACT

A locking assembly has two members which are moveable into coupling engagement with one another. The two members have lock engaging walls, and one of the members has an opening between the lock engaging walls for receiving a lock. The lock comprises a lock body and a retainer. The lock body has a channel for receiving a portion of the retainer. An end of the retainer extends underneath a retainer engaging wall, thus resisting movement of the lock out of the opening.

12 Claims, 8 Drawing Sheets

U.S. PATENT DOCUMENTS

| | | | |
|---|---|---|---|
| 4,716,667 A | 1/1988 | Martin | 37/142 R |
| 4,727,663 A * | 3/1988 | Hahn | 37/458 |
| 4,777,777 A | 10/1988 | Massimo | 403/294 |
| 5,063,695 A | 11/1991 | Briscoe et al. | 37/141 R |
| 5,241,765 A | 9/1993 | Jones et al. | 37/398 |
| 5,333,964 A | 8/1994 | Thomas | 403/294 |
| 5,350,022 A | 9/1994 | Launder et al. | 172/700 |
| 5,564,508 A | 10/1996 | Renski | 172/772 |
| 5,666,748 A | 9/1997 | Emrich et al. | 37/453 |
| 5,806,216 A | 9/1998 | Renski | 37/458 |
| 5,937,549 A | 8/1999 | Bender et al. | 37/455 |
| 6,018,896 A | 2/2000 | Adamic | 37/456 |
| 6,032,390 A * | 3/2000 | Bierwith | 37/456 |
| 6,085,448 A | 7/2000 | Gale et al. | 37/458 |
| 6,108,950 A | 8/2000 | Ruvang et al. | 37/452 |
| 6,415,478 B1 | 7/2002 | Watanabe et al. | 403/297 |

* cited by examiner

LOCK WITH INTERNAL RETAINER

RELATED APPLICATIONS

This application is a continuation of U.S. patent application Ser. No. 09/900,834, filed Jul. 6, 2001, now abandoned.

BACKGROUND OF THE INVENTION

The present invention relates to a lock assembly for securing two components together, and more particularly, to a lock comprising a lock body and a retainer housed within the lock body to retain the lock body in a locked condition.

It is often desired to secure two members together. For example, earthmoving and excavating equipment often employ wear members to protect the equipment from abrasion and wear encountered during use. The wear members are preferably removably attached to the equipment with a locking assembly, so that a wear member may be removed and replaced as needed. An example of such a wear member and associated locking assembly is disclosed in Jones, et. al, U.S. Pat. No. 5,241,765.

The continuing problem is to provide a locking assembly which securely locks the wear member to the equipment so that the wear member remains in place during operation, but yet which allows the wear member to be easily removed and replaced when worn. The wear member is subjected to extreme forces during operation which the lock must be capable of resisting. In addition, the wear member and lock are exposed to rocks, soil fines, mud, grease, and other debris and contaminants. These materials may be impacted into the spaces between the wear member and the lock, thus creating substantial difficulties when attempting to remove the lock from the wear member.

Jones, et. al, U.S. Pat. No. 5,241,765 disclose a locking device having a lock body that pivots into an opening in a wear member, and a resilient latch to retain the lock body in the opening. Because the lock must pivot and/or translate laterally within the opening to be removed, any material such as soil fines which becomes impacted into the spaces between the lock body and the wear member may interfere with removal of the lock body.

Renski, U.S. Pat. No. 5,564,508 and Renski, U.S. Pat. No. 5,806,216 disclose a lock comprised of an arcuate retainer held within an arcuate slot. A variety of mechanisms are disclosed that prevent the retainer from being removed from the slot, including a pin and several different types of springs. Removal from the slot requires that the pin or spring be pried away, which may be difficult in the presence of impacted fines.

What is therefore desired is a lock that may be used to securely retain two members together, such as retaining a wear member in place, that is preferably tolerant of the presence of soil fines, that can withstand extreme forces exerted against it during operation, but that is nonetheless easily withdrawn to allow the two members to be quickly uncoupled.

BRIEF SUMMARY OF THE INVENTION

The present invention overcomes the drawbacks of the prior art by providing a lock assembly for retaining two moveable members with respect to one another. The lock assembly includes a lock comprised of a lock body and a retainer which fits within the lock body to resist movement of the lock body away from the two members which are locked together.

In a first aspect of the invention, a lock assembly includes a first member, a second member, and a lock. The first member and the second member are moveable longitudinally with respect to one another into coupling engagement. The first member and the second member have respective engaging surfaces to resist transverse movement of the first member and the second member with respect to one another when the first member and the second member are in coupling engagement. The first member and the second member each have a lock engaging wall. The second member defines an opening between the lock engaging wall of the first member and the lock engaging wall of the second member when the first member and the second member are in coupling engagement. The opening receives the lock to resist longitudinal movement of the first member with respect to the second member. The lock comprises a lock body and a retainer. The lock body defines at least one channel in communication with a side of the lock body. The retainer is at least partially received within the channel, so that at least a portion of the retainer extends beyond the side of the lock body and interferes with removal of the lock body from the opening.

In a separate aspect of the invention, a lock is provided comprising a lock body and a retainer. The lock body is rigid, and substantially incompressible. The lock body is generally block shaped. The lock body defines an opening and a pair of channels in communication with the opening and in communication with opposite sides of the lock body. The retainer has a hinge portion and a pair of legs, each having a respective end. The hinge portion is receivable within the opening and each of the pair of legs is receivable within a respective one of the pair of channels. The ends of the legs extend beyond the sides of the lock body.

In another separate aspect of the invention, a method is provided for locking a first member to a second member, where the first member and the second member are moveable longitudinally into coupling engagement. The method comprises the following steps. A lock comprised of a lock body and a retainer is provided. The first member and the second member are provided with respective engaging surfaces to resist transverse movement of the first member and the second member with respect to one another when the first member and the second member are in coupling engagement. The first member and the second member are each provided with a lock engaging wall. An opening is defined in the second member between the lock engaging wall of the first member and the lock engaging wall of the second member when the first member and the second member are in coupling engagement. The lock is inserted into the opening to resist longitudinal movement of the first member with respect to the second member. A channel is provided in the lock body in communication with a side of the lock body. The retainer is inserted into the channel of the lock body so that a portion of the retainer extends beyond the side of the lock body to resist transverse movement of the lock body out of the opening.

The various aspects of the invention provide several advantages. First, the invention substantially reduces, if not eliminates, the problem of soil fines interfering with removal of the lock. The lock does not require displacement of soil fines within the opening in the wear member in order to be removed. To remove the lock, the retainer is removed from the lock body, which then allows the lock body to be rotated or pulled out of the opening in the wear member. The lock body travels along a path that allows the lock body to exit the opening without compacting or displacing soil fines. The lock body can be reused many times by simply adding a new retainer, which renews the engagement means of the lock and makes it essentially as strong as a completely new lock. Yet another advantage is that the majority of the retainer is housed within and protected by the lock body, and thus may be formed from a light-weight material. The lock is also vibration resistant, due to the light-weight retainer.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

The present invention relates to a locking assembly for securing two members with respect to one another, such as a moveable or replaceable wear member with respect to a fixed base member. The present invention finds application in many different types of situations in which it is desired to couple or secure two members with respect to one another. For example, the present invention may be used to secure wear members to excavating or mining equipment, such as a wear member to the exterior of a bucket, wear members to stationary equipment, points to adapters, etc.

Figure 1:
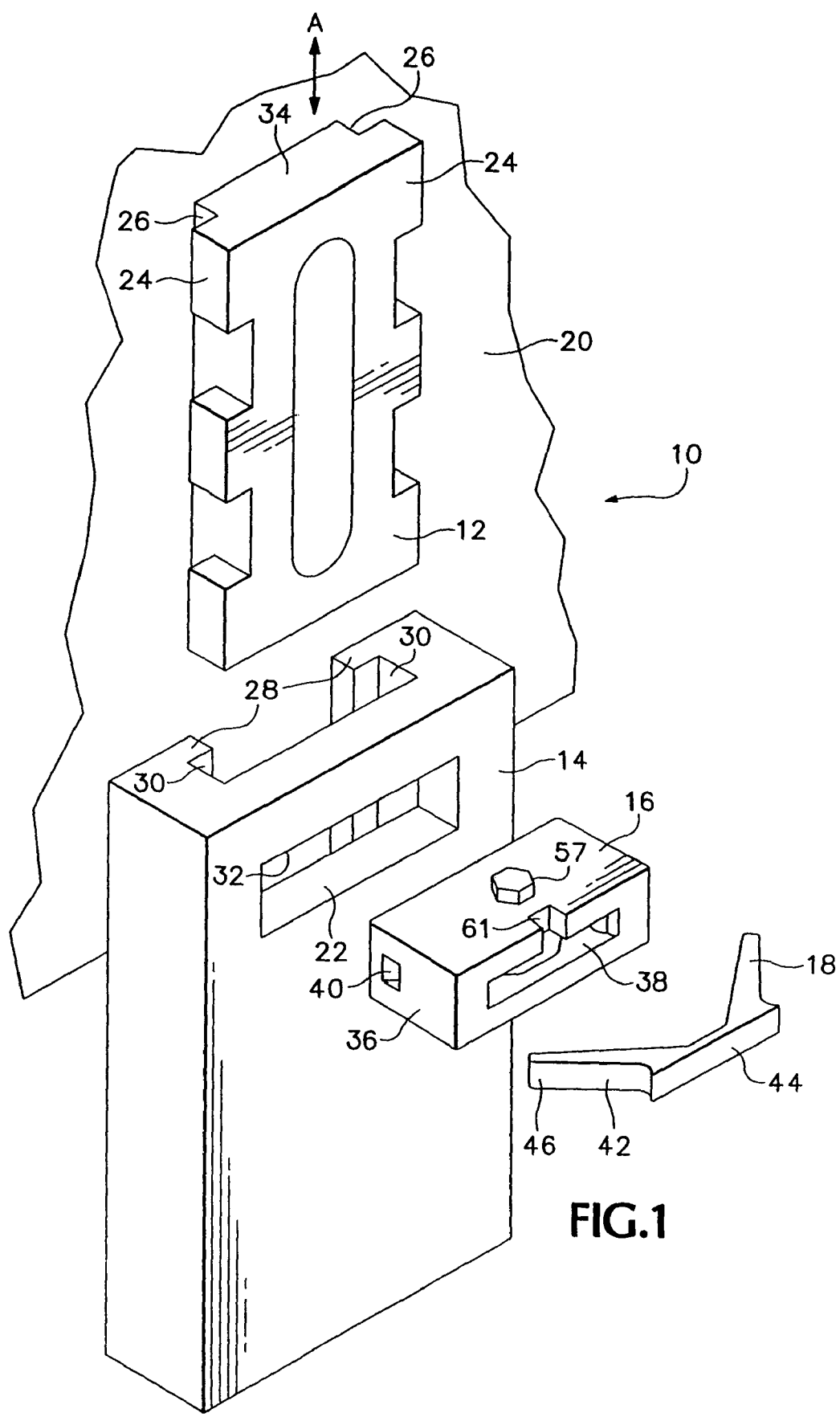
FIG. 1 shows a perspective exploded view of a lock, wear member, and base member.

Referring now to the drawings, wherein like numerals refer to like elements, FIG. 1 shows an exemplary assembly 10 comprising a base member 12, a wear member 14, and a lock comprising a lock body 16 and a retainer 18. The base member 12 is attached to the exterior of the surface 20 to be protected, such as an exterior surface of a dragline bucket or other earthmoving or excavating equipment. The wear member 14 slidably attaches to the base member 12 so as to protect the underlying exterior surface 20. In order to prevent the wear member 14 from slidably detaching from the base member 12, the lock body 16 is inserted into an opening 22 in the wear member 14. The retainer 18 prevents the lock body 16 from falling out of the opening 22. Removing the retainer 18 allows the lock body 16 to be removed from the opening 22, thus allowing the wear member 14 to be removed and replaced when necessary.

Figure 2:
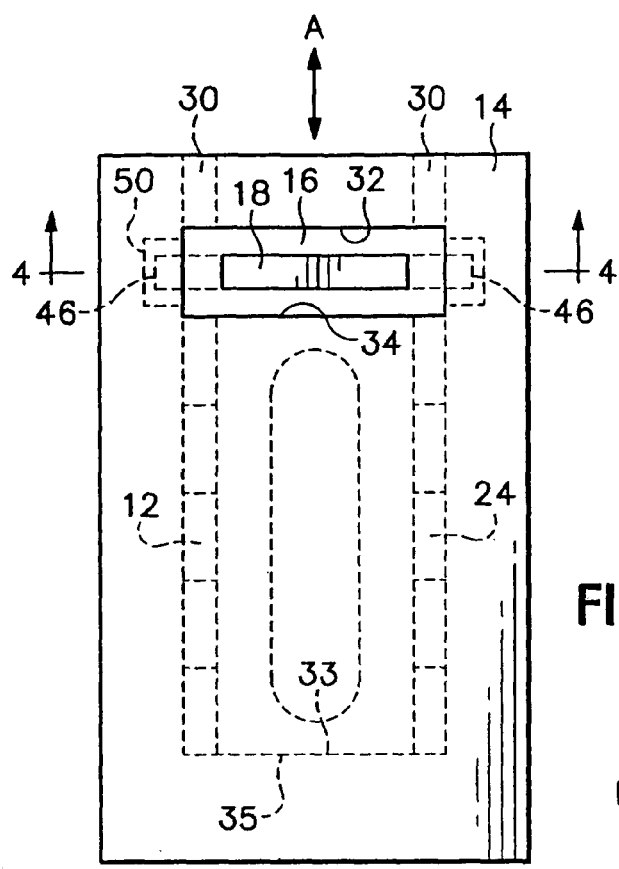
FIG. 2 is a plan view of the assembly of FIG. 1.

Turning now to the base member 12 and wear member 14 in more detail, the base member 12 and wear member 14 define a generally longitudinal direction depicted by the arrow A in FIGS. 1 and 2. As used herein, the term "longitudinal" is used in the sense of the direction of movement of the wear member and base member with respect to one another when being coupled together. Both the base member and wear member have respective engaging structures to resist transverse movement of the wear member and base member with respect to one another when the wear member and base member are coupled together. "Transverse" movement is movement that is perpendicular to "longitudinal" movement, along a direction as shown by arrow B in FIGS. 3–4.

As shown in FIGS. 1 and 2, the base member 12 has a plurality of protruding rails 24 on either side. The rails 24 are spaced apart from the surface 20, and define a pair of slots 26 between the rails 24 and the surface 20. The wear member 14 has a corresponding pair of rails 28, which define a pair of elongate slots 30 extending longitudinally within the wear member 14. The rails 24 of the base member slide into the slots 30 of the wear member 14, while the rails 28 of the wear member 14 slide into the slots 26 of the base member 12. The shapes of the respective rails and slots of the base and wear members thus provide an interlocking engaging structure with opposing surfaces when the base member and wear member are coupled together that prevents transverse movement of the two members with respect to one another when the two members are assembled.

While a particular arrangement of rails and slots is shown in the embodiment of FIGS. 1–4, other engaging surfaces may be provided to prevent transverse movement of the two members with respect to one another. The lock of the present invention may be used with any of the engaging structures depicted in U.S. Pat. No. 5,241,765, the complete disclosure of which is herein incorporated by reference. Thus, while FIG. 1 shows the interlocking rails and slots extending along only a portion of the length of the two members, the interlocking structure may be provided along the entire length of each of the two members. In general, any tongue and groove engaging structure may be used. The engaging structure may be generally T-shaped in crosssection, as shown in FIG. 1, or may be dove-tail shaped. Similarly, the engaging structures may be those disclosed in Renski, U.S. Pat. No. 5,564,508, the disclosure of which is herein incorporated by reference. Alternatively, engaging surfaces could simply be the interior and exterior surfaces of the two coupled members, respectively, such as in the case of a point and adapter.

Returning to the exemplary embodiment of FIGS. 1–4, the base member 12 and wear member 14 also each have lock engaging surfaces to prevent longitudinal movement of the base member 12 with respect to the wear member 14. For example, as shown in FIGS. 1 and 2, the wear member 14 has a lock engaging wall 32. Likewise, the base member 12 has a corresponding lock engaging wall 34. As shown in FIG. 2, the lock engaging wall 32 of the wear member 14 is longitudinally spaced apart from the lock engaging wall 34 of the base member 12 when the base member 12 and wear member 14 are coupled together. While FIGS. 1 and 2 show the lock engaging walls 32 and 34 being perpendicular to the longitudinal direction, the walls may be set at another angle relative to the longitudinal direction. All that is required is that the walls be longitudinally spaced apart so as to be capable of receiving a lock body therebetween.

Figure 4:
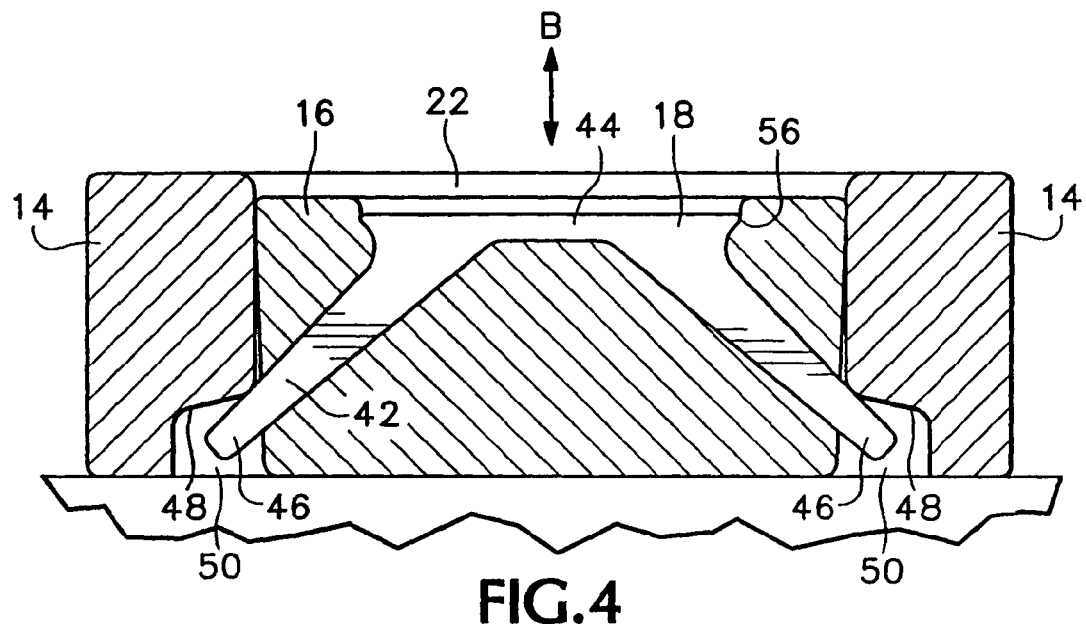
FIG. 4 is a side sectional view like that of FIG. 3 showing the lock inserted into the opening in the wear member, and the retainer inserted into the lock body.
Figure 4A:
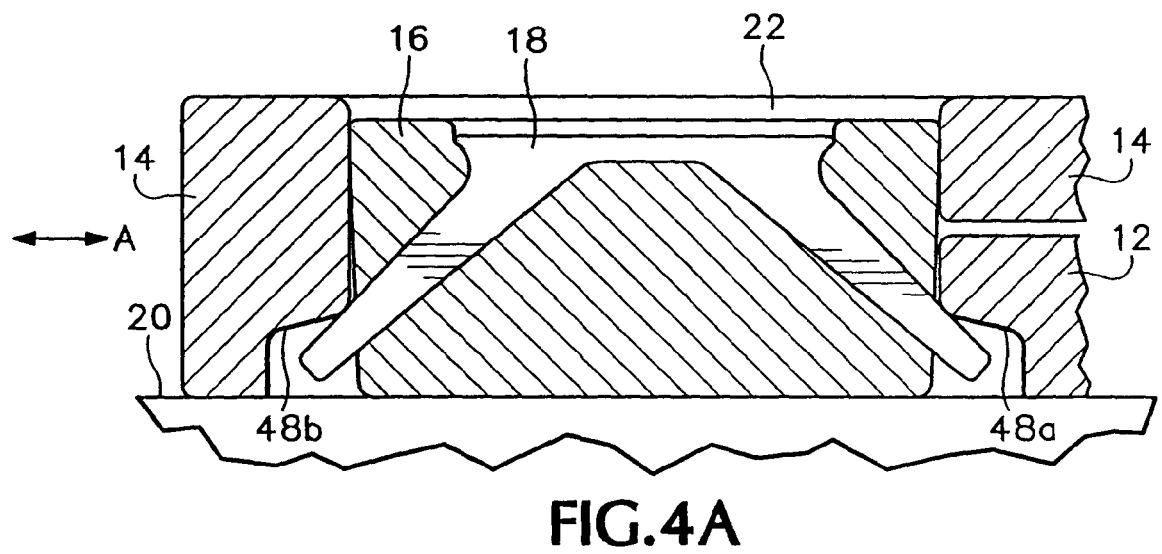
FIG. 4A is a view like that of FIG. 4 of an alternative embodiment.
Figure 4B:
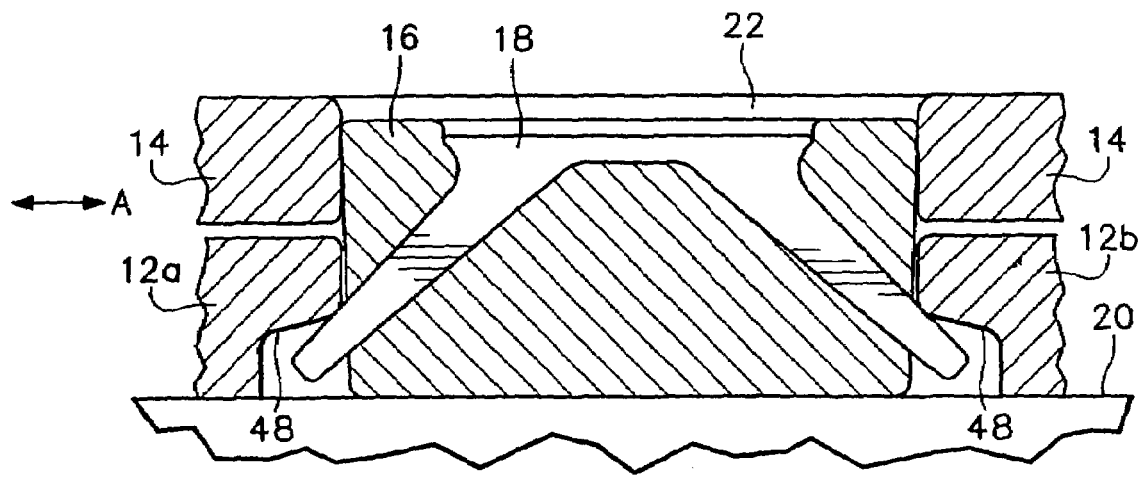
FIG. 4B is a view like that of FIG. 4 of yet another alternative embodiment.

The wear member 14 defines an opening 22 for receiving the lock body 16. The opening is located on the wear member such that it is between the lock engaging surface 32 of the wear member 14 and the lock engaging surface 34 of the base member 12 when the two members are coupled together. To prevent the base member 12 and wear member 14 from moving longitudinally relative to each other and detaching from one another, the lock body 16 is inserted into the opening 22. As shown in FIG. 2, the lock engaging wall 32 of the wear member 14 engages the lock body 16, preventing the wear member from moving rearward out of coupling engagement with the base member 12. ("Forward" refers to movement into coupling engagement, while "rearward", refers to movement out of coupling engagement.) The lock body 16 is prevented from moving longitudinally rearward by the lock engaging surface 34 of the base member. In the embodiment of FIG. 2, the wear member 14 is prevented from moving forward due to the engagement of the end 35 of the base member and the rear internal wall 33 of the wear member. Alternatively, the lock may be inserted between two longitudinally spaced-apart base members. For example, FIG. 4B depicts two longitudinally spaced-apart base members 12a and 12b, each having a lock engaging surface facing the lock body 16. (In FIG. 4B the retainer 18 is oriented perpendicularly to the direction depicted in FIG. 2.)

Figure 3:
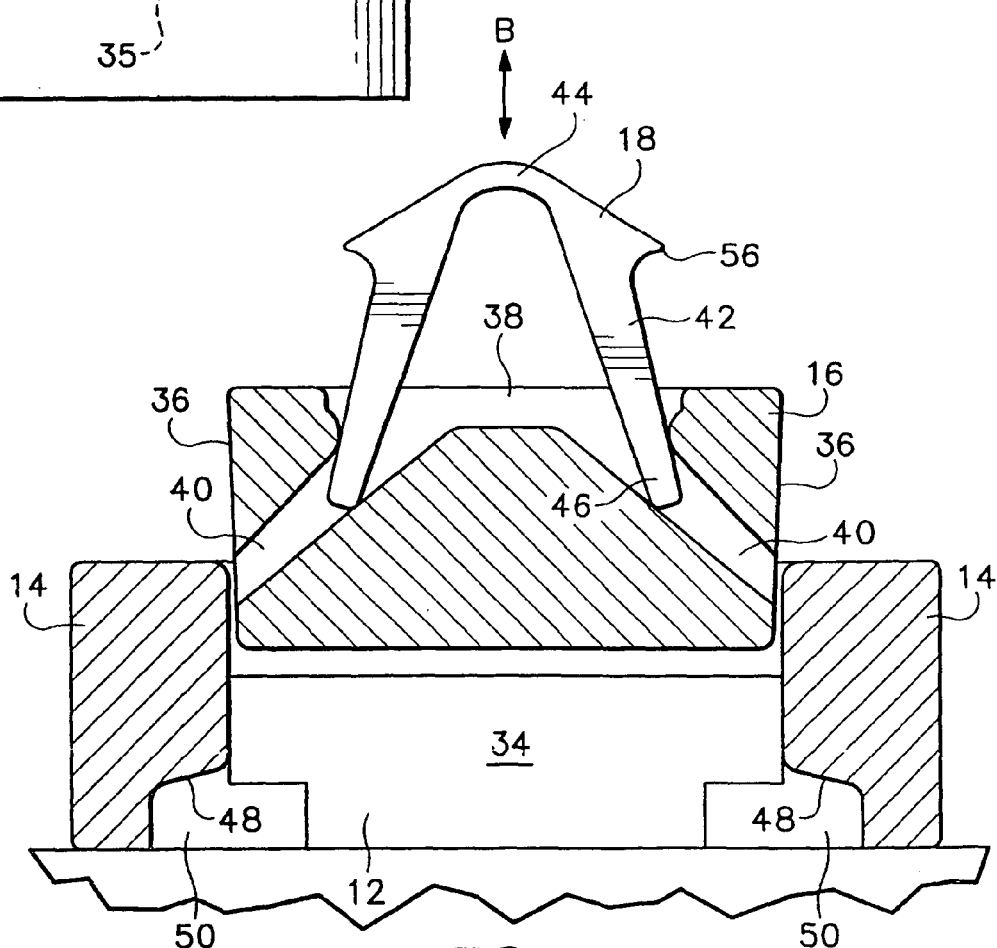
FIG. 3 is a side sectional view of the lock of FIG. 1 being inserted into an opening in a wear member, showing the retainer being inserted into the lock body.

Turning now to the lock, the lock consists of a lock body 16 and retainer 18. As shown in FIG. 1, the lock body 16 is generally block-shaped, having a generally rectangular solid shape corresponding with the shape of the opening 22. Referring now more particularly to FIGS. 3 and 4, the lock body 16 defines an upper opening 38 and a pair of channels 40 in communication with the opening 38. The lock body 16 is sufficiently sized so that when inserted into the opening 22 as shown in FIG. 4, it will engage both the lock engaging wall 34 of the base member and the lock engaging wall 32 of the wear member. The lock body 16 is preferably made from an incompressible material, such as steel. However, in applications where the base member 12 and wear member 14 are not subject to substantial thrust forces, other materials may be used for the lock body 16. While the figures depict a block-shaped lock body, other shapes may be used for the lock body 16, it being only necessary for the lock body 16 to resist movement of the base member 12 and wear member 14 with respect to one another. Thus, the lock body may be cylindrical, wedge-shaped (trapezoidal), or arcuate.

The present invention achieves its advantages by employing a retainer 18 to hold the lock body 16 in the opening 22. The channels 40 communicate with respective sides 36 of the lock body 16. The retainer 18 has two legs 42 extending generally away from one another. In one embodiment, a flexible hinge portion 44 interconnects the two legs 42. The flexible hinge portion 44 is received within the upper opening 38 of the lock body 16, while the legs 42 fit within the two channels 40.

Referring now particularly to FIG. 4, when the retainer 18 is inserted into the lock body 16, the retainer 18 retains the lock body 16 in the opening 22 of the wear member 14. As shown in FIG. 4, the legs 42 of the retainer are slightly longer than the channels 40 of the lock body 16. The ends 46 of the legs 42 thus extend from the lock body 16 when the retainer 18 is inserted into the lock body 16. As shown in FIG. 4, the ends 46 extend past the sides 36 of the lock body 16. The wear member 14 has a pair of overhanging walls 48 which engage the respective ends 46 of the legs 42 of the retainer 18 in order to resist transverse movement of the legs 42, and hence the lock, out of the opening 22. The walls 48 are located adjacent to and above the ends 46 of the legs 42 and define respective cavities 50 within which the respective ends 46 of each of the legs 42 may be received.

As shown in FIG. 4, the overhanging walls 48 are provided by the wear member 14. Alternatively, the overhanging walls may be provided by another structure. For example, the base member 12 may have a pair of surfaces for engaging the ends 46 of the legs 42. Alternatively, another structure connected to the base member or wear member may be provided with walls to interfere with transverse movement of the ends 46 of the retainer legs 42. While FIGS. 3 and 4 show the walls 48 spaced apart from one another in a direction perpendicular to the longitudinal direction, the retainer engaging walls 48 may be longitudinally spaced apart from one another, as shown in FIG. 4A. In such an arrangement, one wall 48a may be provided by the base member 12, while the other wall 48b is provided by the wear member 14. (The retainer 18 in FIG. 4A is oriented in a direction that is perpendicular to the direction depicted in FIG. 2.) FIG. 4B shows another embodiment in which the lock body 16 is inserted between two base members 12a and 12b, each providing a retainer engaging wall 48.

In any event, the retainer engaging walls 48 engage the ends 46 of the legs 42, thus resisting transverse movement of the lock body 16 out of the opening 22. This prevents the lock body 16 from exiting the opening 22, and thus prevents the base member 12 and wear member 14 from moving longitudinally with respect to one another.

In one embodiment, the retainer 18 is formed at least in part from an elastomeric or flexible material(s) so that the legs 42 may be bent and inserted into the channels 40. Preferably, the retainer 18 is formed from a polymeric material or composite material. The material used for the retainer 18 may be chosen depending on the conditions of the particular application, such as the severity of the loads likely to be encountered, the temperature, the material in which the lock assembly is used, etc. For example, if the assembly 10 is to be used in an underwater application, then a material having a higher coefficient of friction when wet would be preferred. If the assembly 10 is to be used in a high temperature application, then a material such as a thermalset plastic may be required which would not break down due to heat. If the assembly 10 is used in an extreme duty application, then steel or heat-treated aluminum may be bonded to the legs 42 of the retainer 18 to provide additional shear strength. For hot-slag type applications, the retainer 18 may be made of spring steel instead of an elastomer.

Figure 5:
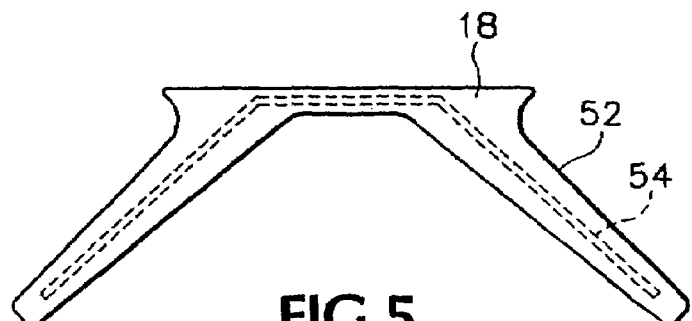
FIG. 5 shows a side view of an alternative embodiment of a retainer with a reinforcing member shown in phantom view.

When the retainer 18 is formed from a polymeric material, the retainer 18 may also optionally have an added steel portion bonded to the hinge portion 44 to add strength without decreasing elasticity. This increases the strength of the lock in assembly and eases removal by reducing the possibility of breakage of the hinge portion during removal. For example, FIG. 5 shows a preferred retainer 18 comprised of an outer polymeric material 52 and having an inner steel insert 54. The steel insert 54 lends strength to the retainer, while the use of the polymeric material 52 for the bulk of the retainer 18 insures that the retainer will be light-weight and flexible. The addition of steel or other strengthening material to the retainer is not required in most applications, but may be used in heavy duty or extreme duty applications.

To lock the assembly, the lock body 16 and retainer 18 are inserted into the opening 22. The retainer 18 is first partially inserted into the lock body 16 through the upper opening 38. FIG. 3 illustrates the insertion of the flexible retainer 18 into the lock body 16. The hinge portion 44 of the retainer 18 is bent, and the two legs are squeezed toward each other and inserted into the upper opening 38. The lock body 16 is then inserted into the opening 22. The retainer 18 is pushed down, so as to push the legs 42 down into the channels 40. FIG. 4 illustrates the hinge portion 44 received within the upper opening 38 and the legs 42 received within the channels 40 of the lock body 16.

It is preferred that the retainer 18 and the cavities within the lock body 16 (e.g. the upper opening 38 and channels 40) are sized correspondingly so as to reduce the amount of space available for soil fines or other material to become impacted within the lock body 16. In addition, because the shape of the retainer corresponds to the shape of the upper opening 38 in channels 40, the retainer must be deformed or bent in order to be removed from the upper opening in the channels. Preferably, the retainer 18 returns to its relaxed shape when fully inserted into the lock body, as illustrated in FIG. 4. While the retainer 18 is flexible, it nonetheless is sufficiently inelastic to resist deformation. Thus, to remove the retainer 18, a sufficient force must be applied to deform the retainer 18. The need to provide a sufficient force to remove the retainer 18 means that the retainer 18 is held more securely within the lock body 16.

To remove the lock body 16 from the opening 22, the retainer 18 is removed from the lock body 16. Preferably, the lock body has a recess 61 at the top center of the lock body 16 in communication with the upper opening 38 to aid in placing a pry tool under the hinge portion 44 of the retainer 18. Alternatively, the retainer 18 may simply have a lip 56 which may be used to pry the hinge portion 44 out of the upper opening 38. Once the hinge portion 44 has been pried out, the retainer may be easily pulled out of the lock body 16. For example, when the hinge portion 44 is pushed slightly out of the upper opening 38, a pry tool may be inserted underneath the hinge portion 44 in the space created between the lock body 16 and the hinge portion 44.

After the retainer 18 has been removed, the lock body 16 may be removed from the opening 22. The lock body travels out of the opening along a path such that the lock body does not compact or displace a significant amount of material, such as soil fines, within the opening. That is, the path that the lock body travels is such that once the top of the lock body has been cleared of material, the sides of the lock body exit the opening by following within a substantial portion, and preferably all of, the profile of the top of the lock body and without lateral movement within the opening that would require compacting or displacing soil fines in the opening. By "profile" is meant the outer perimeter of the upper or top portion of the lock body. For example, in the embodiment shown in FIGS. 1–4, the lock body is pulled transversely straight out of the opening, and does not pivot or move laterally within the opening in order to be removed. Thus, the lock body travels along a path that does not compact or displace a significant amount of material within the opening. While it is preferred that the sides of the lock body 16 follow entirely within the profile, nevertheless the lock body may have some projecting features, such as a take-up member (described below), which displace a relatively small amount of material.

In addition, while the embodiment of FIGS. 1–4 shows transverse movement directly away from the wear member, the opening and lock body may be correspondingly shaped so that the lock body travels along a curved or inclined path but nonetheless may be removed without the need to displace a significant amount of material within the opening. Thus, the lock body may be arcuate and the opening may be correspondingly shaped, such that the lock body rotates out of the opening. Alternatively, the lock body may be shaped like a rhombohedron and translated along an inclined path out of the opening. In general, as the lock body translates out of the opening, the profile of the lock body defines a volume of space. The shape of the lock body and opening are chosen so that the path the lock body travels as it exits out of the opening is such that the following sides of the lock body preferably remain entirely within the defined volume as the lock body travels along the exit path. Thus, lock body shapes which taper from the top to the bottom or which are wedge-shaped are preferred.

Preferably, the lock body 16 substantially fills the opening 22. By "substantially fills" is meant that the lock body occupies at least 85% of the volume of the opening 22, more preferably at least 90% of the volume of the opening, and even more preferably at least 95% of the volume of the opening. By substantially filling the opening 22, the lock body 16 prevents the ingress of fines or other material which could interfere with removal of the lock body 16 from the opening 22. In addition, the top of the lock body is preferably flush with the exterior surface of the wear member, in a worn condition, so that a minimum amount of material must be cleared away to remove the lock body.

The locking assembly 10 provides several advantages. One of the advantages of the present locking assembly is that the lock is extremely tolerant of fine materials, such as dirt, grit, sand and mud, which are encountered during earthmoving and excavating applications. In use, fines become impacted into locks. When it is desired to remove the lock, the fines must often be removed in order to allow the necessary movement of the lock so that it may be removed. However, the lock of the present invention overcomes these difficulties. The retainer 18 may be removed from the lock body 16 by simply grasping the hinge portion 44 and pulling the retainer legs 42 out of the channels 40. It is not necessary to move the lock body 16 to remove the retainer 18. The lock body 16 may then be pulled straight out of the opening 22 (that is, transversely) without the necessity of being rotated or moved sideways or longitudinally within the opening 22. Thus, the lock body 16 does not need to compact or displace any fines to be removed. This greatly improves the ease with which the lock may be removed from the opening 22 in the wear member.

The use of the retainer 18 also allows the lock to withstand a very high load but yet be removed with a relatively small pry tool. The primary loads are directed along the longitudinal, rather than the transverse direction. Thus, the lock body 16 may be formed of a rigid, incompressible and non-flexible material to withstand such loads. However, the retainer 18 is not subjected to the direct stress on the wear member 14, but rather only transverse movement of the lock body 16. Indeed, the majority of the retainer is housed within and protected by the lock body. Since the load on the ends 46 of the legs 42 is relatively small, light-weight, flexible materials may be used for the retainer 18.

The locking assembly 10 also has the advantage that the lock body 16 may be reused many times by simply adding a new retainer 18. This renews the engagement means of the lock body 16 and returns the lock to essentially its original strength.

The lock is also vibration resistant. When a light-weight material, such as an elastomeric, polymeric material, is used for the retainer 18, the retainer 18 is so light that vibration has little effect on it. In addition, the force required to deform and remove the retainer, although minimal, is many times the weight of the retainer 18 and the lock body 16. Therefore, even under extreme dynamic loads, the lock should remain in place in the opening 22. Thus, the lock may find particular utility in applications subject to vibration, such as flywheels, vibration dampers, disc brakes etc.

The lock body 16 may also optionally include a take-up member 57 to improve the fit of the lock body 16 within the opening 22 as shown in FIG. 1. For example, the lock body 16 may optionally be provided with a longitudinally extending bolt or a composite steel/elastomer insert. This allows the longitudinal thickness of the lock body 16 to be increased, thus providing for a tighter fit within the opening 22. Of course, if the take-up member extends too far away from the side of the lock body, it may, if too large, interfere with removal of the lock due to displacement of a significant amount of soil fines above the take-up member during removal.

Figure 6:
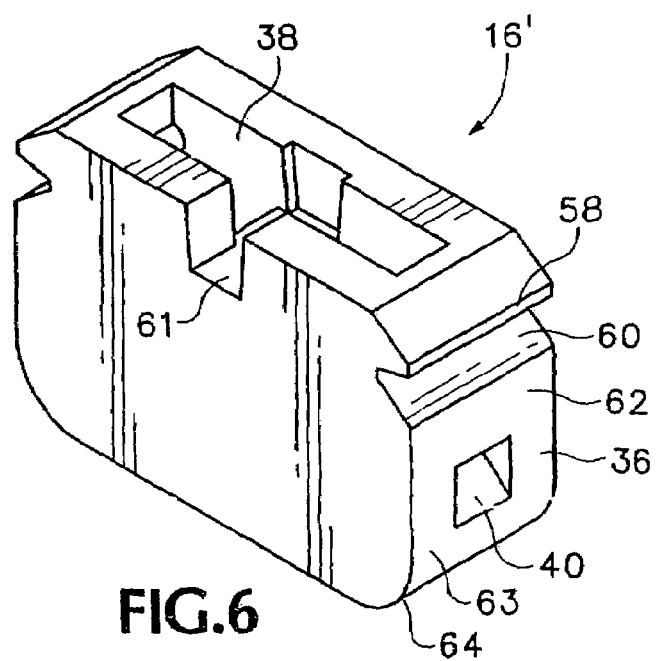
FIG. 6 shows a perspective view of an alternative embodiment of a lock body.

FIG. 6 shows another embodiment of a lock body 16' of the present invention. The lock body 16' has a pair of pry ledges 58 located on either side of the lock body 16', and corresponding grooves 60 for receiving the end of a pry tool. The pry ledges at the sides 36 of the lock body 16' aid in prying the lock body 16' out of the opening 22 after the retainer 18 has been removed. In addition, the lock body 16' has a recess 61 at the top center of the lock body 16' in communication with the upper opening 38 to aid in placing a pry tool under the hinge portion 44 of the retainer 18. The sides 36 of the lock body 16' are slightly tapered, so that the upper portion 62 of the lock body 16' is slightly wider than the lower portion 63 of the lock body. This reduces the resistance to removal of the lock body 16' from the opening 22, especially in the presence of impacted fines. In addition, the bottom corners 64 are rounded. This also reduces resistance to removal of the lock body 16' from the opening 22, and further allows the lock body 16' to pivot slightly when pried out of the opening 36.

Figure 7:
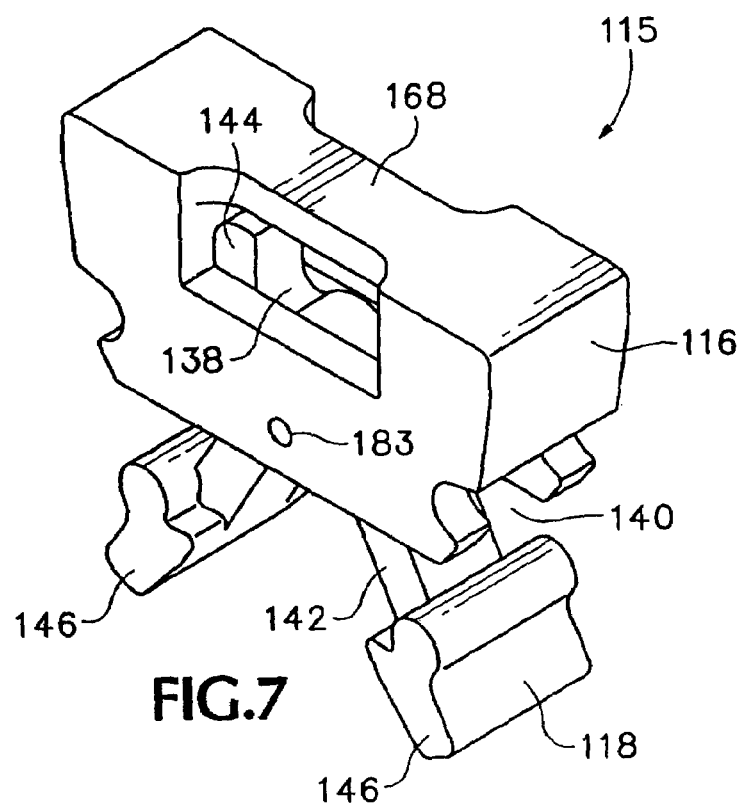
FIG. 7 shows a perspective view of another alternative embodiment of a lock.
Figure 8:
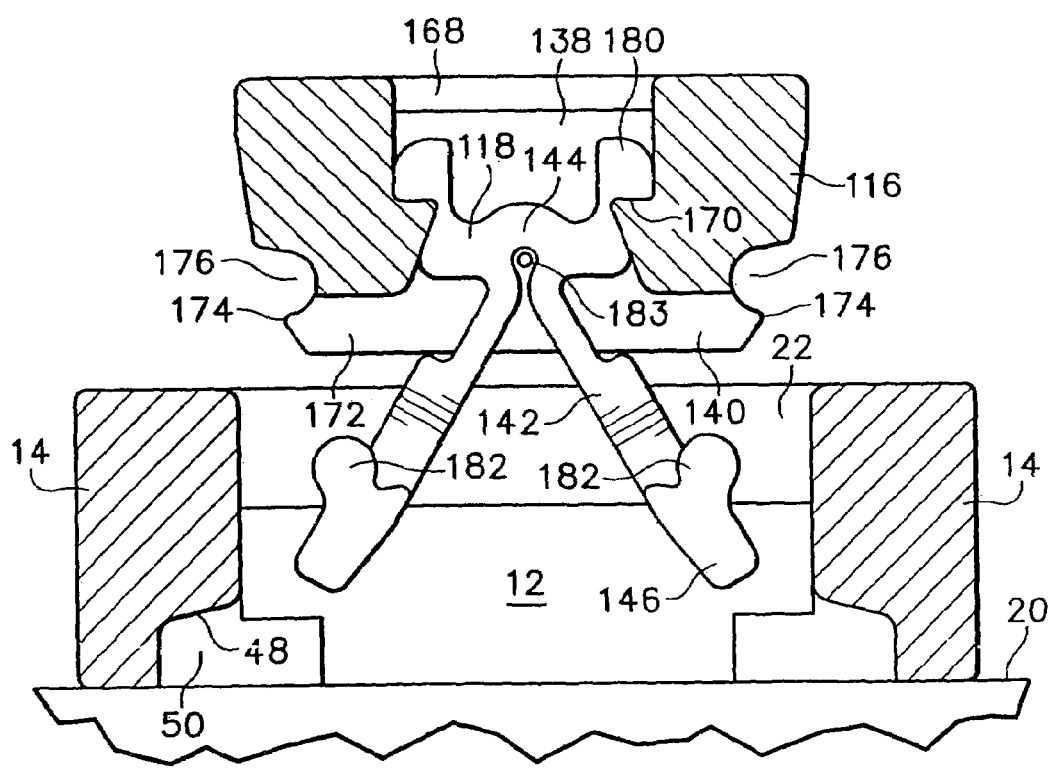
FIG. 8 shows a side sectional view of the lock of FIG. 7 being inserted into an opening in a wear member.
Figure 9:
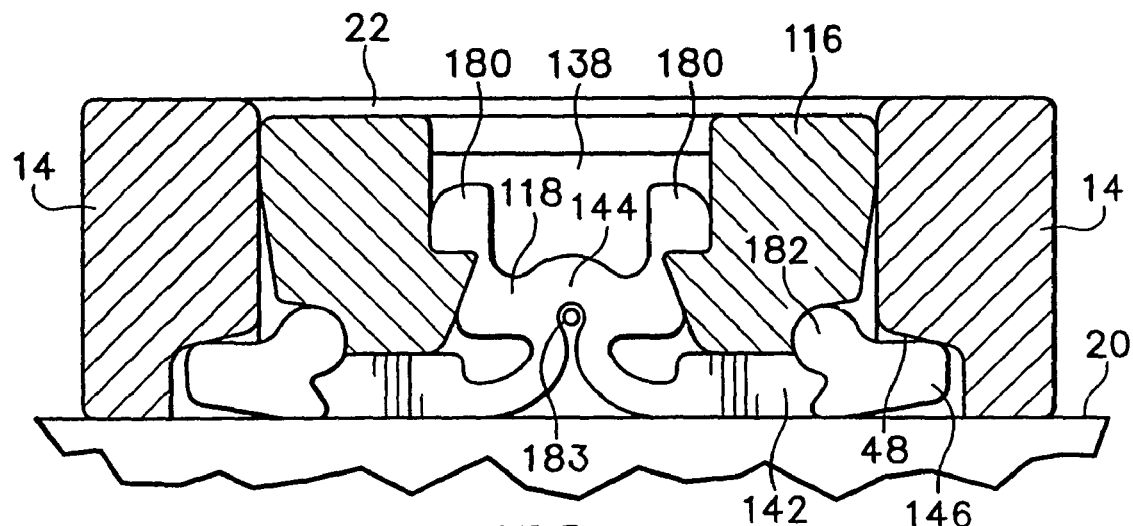
FIG. 9 shows the lock of FIG. 7 inserted into the opening in the wear member.

FIGS. 7–9 show yet another embodiment of a lock 115 of the present invention. The lock 115 has a lock body 116 and a retainer 118. The lock body 116 has an upper opening 138 and a pair of channels 140. The channels 140 are open at the bottom of the lock body 116. The lock body 116 also has an arch 168 extending above the upper opening 138 for grasping the lock body 116. The retainer 118 has legs 142 and a hinge portion 144. The hinge portion 144 allows the legs 142 to be moved toward and away from each other. The legs 142 themselves may be rigid if desired. The ends 146 of the legs 142 extend beyond the lock body 116 to retain the lock within the opening 22 as described above with respect to the other embodiments of the invention.

The lock body 116 and retainer 118 have corresponding structures to allow the lock body 116 and retainer 118 to be securely fastened to one another. In order to hold the retainer 118 in the lock body 116, the lock body 116 has a pair of upper shelves 170 located near the upper opening 138. The retainer 118 has a corresponding pair of fastening members 180 connected to the hinge portion 144. In use, the hinge portion 144 is inserted through the channels 140 at the bottom of the lock body and into the upper opening 138. The fastening members 180 squeeze past the shelves 170 and then snap back into shape, extending over the shelves 170 as shown in FIG. 8. The shelves 170 prevent the fastening members 180 from being pulled back through the channels 140 and out of the lock body 116. Conversely, the retainer 118 may be removed by squeezing the fastening members 180 toward each other and pushing the retainer 118 down through the channels 140.

In addition, the lock body 116 and retainer 118 have corresponding structures to allow the retainer legs 142 to be securely fastened to the lock body 116. The lock body 116 has a pair of walls 172 defining the channels 140 which terminate in lips 174. The lock body 116 defines a pair of cavities 176 above and adjacent to the lips 174. The retainer 118 has at each end an ear 182. Initially, when the lock 115 is inserted into the opening 22, the legs 142 are allowed to hang freely beneath the lock body 116 as shown in FIG. 7. Once the lock body 116 is fully inserted into the opening 22, the legs 142 are received in the channels 140, and the ears 182 push over the lips 174 so as to be received within the cavities 176. The corresponding engagement of the lips 174 with the ears 182 causes the ends 146 to resist transverse movement of the lock body 116 out of the opening 22. In addition, a pin 183 may be inserted through the lock body 116 and through the legs 142 to further secure the retainer within the lock body.

As in the case of the retainer 18 of FIGS. 1–4, the retainer 118 must be deformed (that is, the hinge portion 144 and/or legs 142 must be stretched outward and the ears 182 pulled over the lips 174) to remove the retainer. The retainer's resistance to deformation thus acts to secure the retainer 118 in the lock body 116.

One of the advantages of this embodiment of the invention is that the lock may be removed in a single step. To remove the lock 115 from the opening 22, the arch 168 is either pulled or pried. The ears 182 are pulled out of the cavities 176, so that the ends 146 no longer resist transverse movement of the lock body 116 out of the opening 22. The fastening members 180, however, continue to hold the retainer 118 within the lock body 116. Thus, the retainer 118 and lock body 116 are removed from the opening 22 in a single step.

Figure 10:
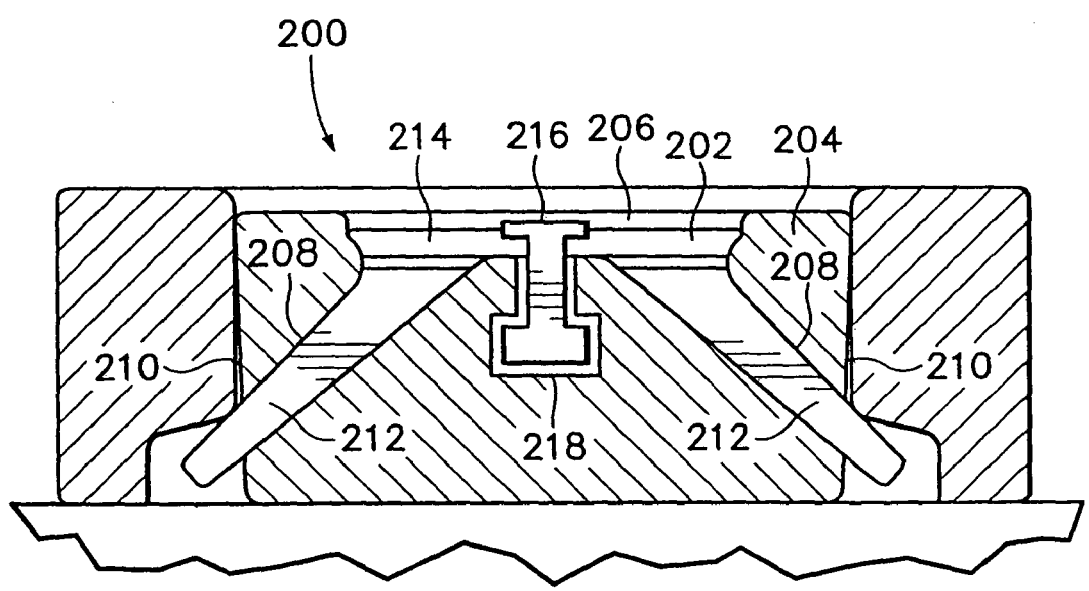
FIG. 10 shows yet another alternative embodiment of a retainer.

FIG. 10 shows yet another alternative embodiment of a lock 200 of the present invention. This embodiment is like the embodiment shown in FIGS. 1–4, with the exception that the retainer 202 comprises several rigid members rather than a single flexible member. Referring to FIG. 10, the lock body 204 has an upper opening 206 and a pair of channels 208 just like those of the embodiment of FIGS. 3–4. The channels 208 progressively narrow from the upper opening 206 toward the sides 210. The retainer comprises three separate members. The retainer has two legs 212. The legs 212 are wedge shaped so as to be retained within the two channels 208 and not exit out the sides 210. The retainer also has a cap 214, which prevents the legs 212 from exiting out of the upper opening 206. The cap 214 fits into the upper opening 206 and covers the upper ends of the two legs 212. This embodiment has the advantage that the legs may be formed from relatively stiff material so as to withstand greater loads than retainers having flexible legs, and thus may be suitable for heavy duty applications.

The cap 214 may be retained in the upper opening 206 by any conventional method. As shown in FIG. 10, the cap 214 is retained by a lock member such as a key 216. The key 216 is inserted through a bore in the retainer (not shown) so that a lower portion is received within a keyhole 218 in the lock body. In the embodiment depicted in FIG. 10, the key 216 is rotated after insertion into the keyhole 218 to retain the cap 214. Alternatively, the cap 214 could be retained with a bolt or other mechanical device. As yet another alternative, the cap 214 could be flexible and inserted underneath a projecting ledge or lip of the lock body so as to be retained within the upper opening. As yet another alternative, the cap and lock member may be combined into a single member.

While the various embodiments of the retainer have been shown having two legs, it is possible to retain the lock body within the opening using a retainer having only a single leg. Thus, the present invention encompasses retainers having one or more legs. In addition, the lock body may be retained using multiple retainers.

While FIGS. 1–4 depict a base member 12 and wear member 14, the lock assembly may be used with any two members which may be coupled together. The members do not necessarily need to be attached to a surface. For example, referring now to FIGS. 11–13, a point 300 and adapter nose 302 are shown. The top and bottom surfaces of the adapter nose engage the corresponding interior surfaces of the socket of the point so as to resist transverse movement of the point with respect to the adapter. The lock body 304 is inserted into an opening 306 in the point 300, which communicates with a recess 308 in the nose 302. The lock is inserted into the opening 306 so as to resist longitudinal movement of the point 300 with respect to the adapter nose 302. While FIGS. 11–13 show the lock at the side of the point and nose, alternatively, the lock may be placed at other locations, such as the top of the point and nose.

Figure 13:
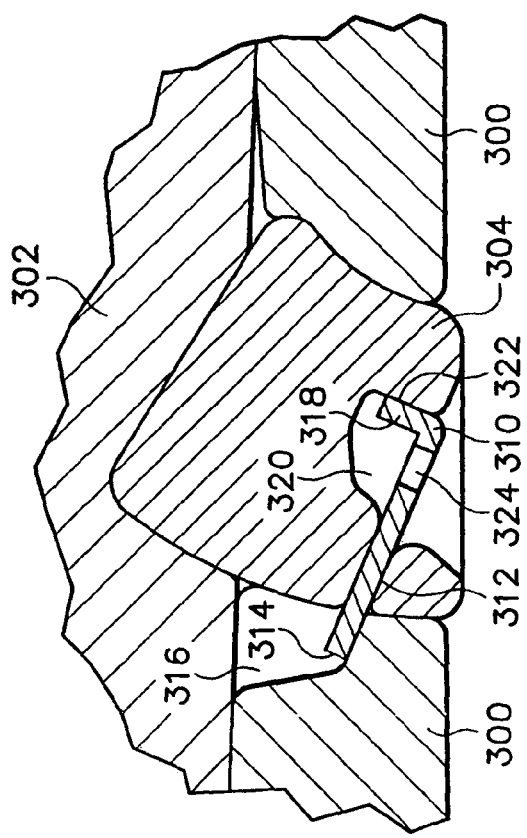
FIG. 13 is a partial cross-section taken along line 13—13 of FIG. 12.

The cross-sectional view of FIG. 13 shows a channel 312 in the lock body and an end 314 of a leg of the retainer 310. The end 314 of the retainer 310 extends into a cavity 316 defined by the point 300. Thus, when inserted into the channel 312, the retainer 310 prevents the lock body 304 from being pivoted out of the recess 308 and the opening 306.

The retainer may be held in position by any mechanical means that prevents the retainer from becoming dislodged from the channel 312. For example, in the embodiment shown in FIGS. 11–13, the retainer 310 is flexible, so that it may be inserted into the channel 312. The retainer has a distal portion 318 that is received within a recess 320 in the lock body 304. The engagement of the distal portion 318 with an interior wall 322 of the lock body 304 prevents the retainer 310 from becoming displaced from the channel 312. To remove the retainer 310, a pry tool may be inserted into the slot 324, and the retainer 310 may be bent and extracted from the channel 312.

Figure 11:
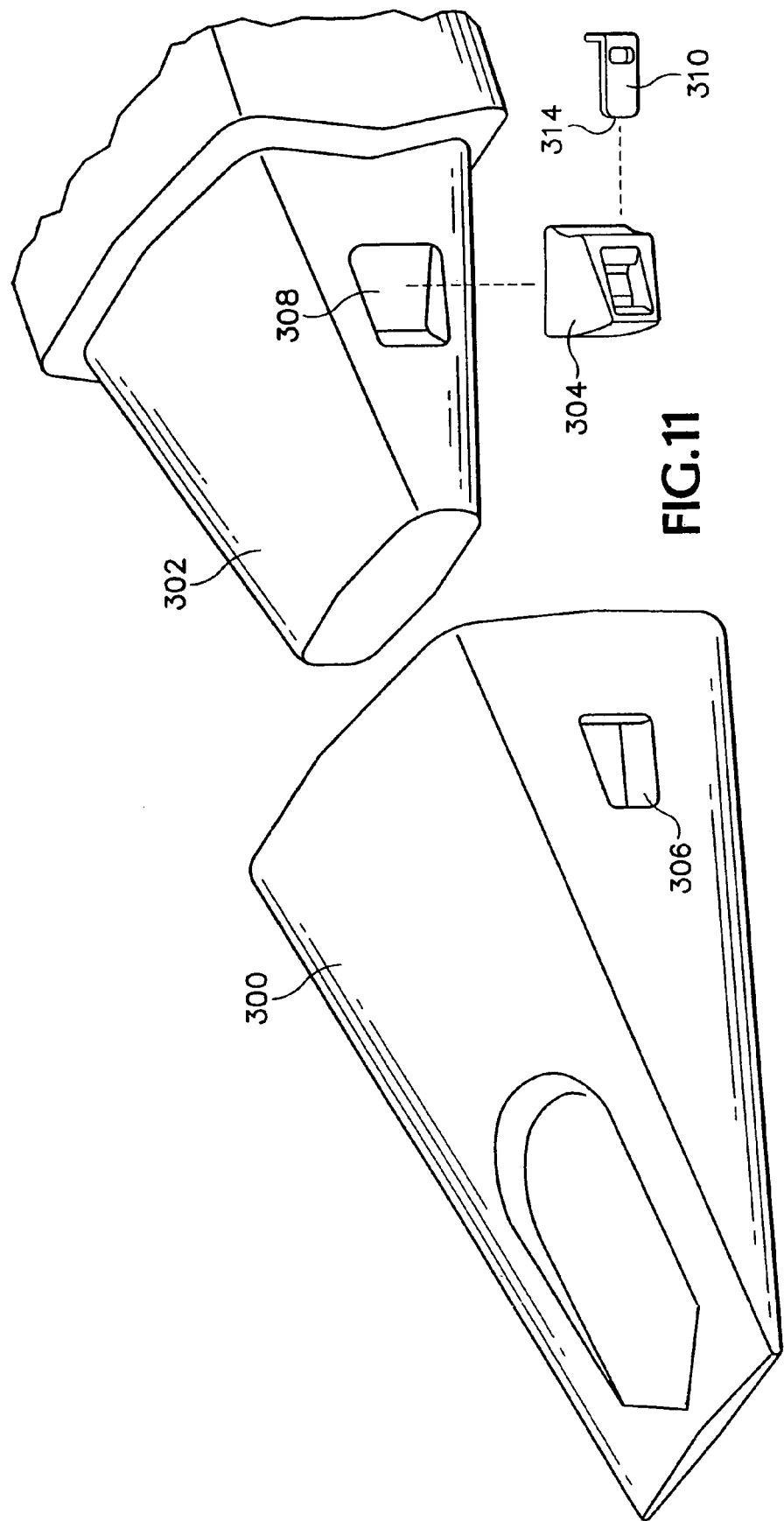
FIG. 11 shows a perspective exploded view of a tooth system comprising a point, a nose, a lock body and a retainer.
Figure 12:
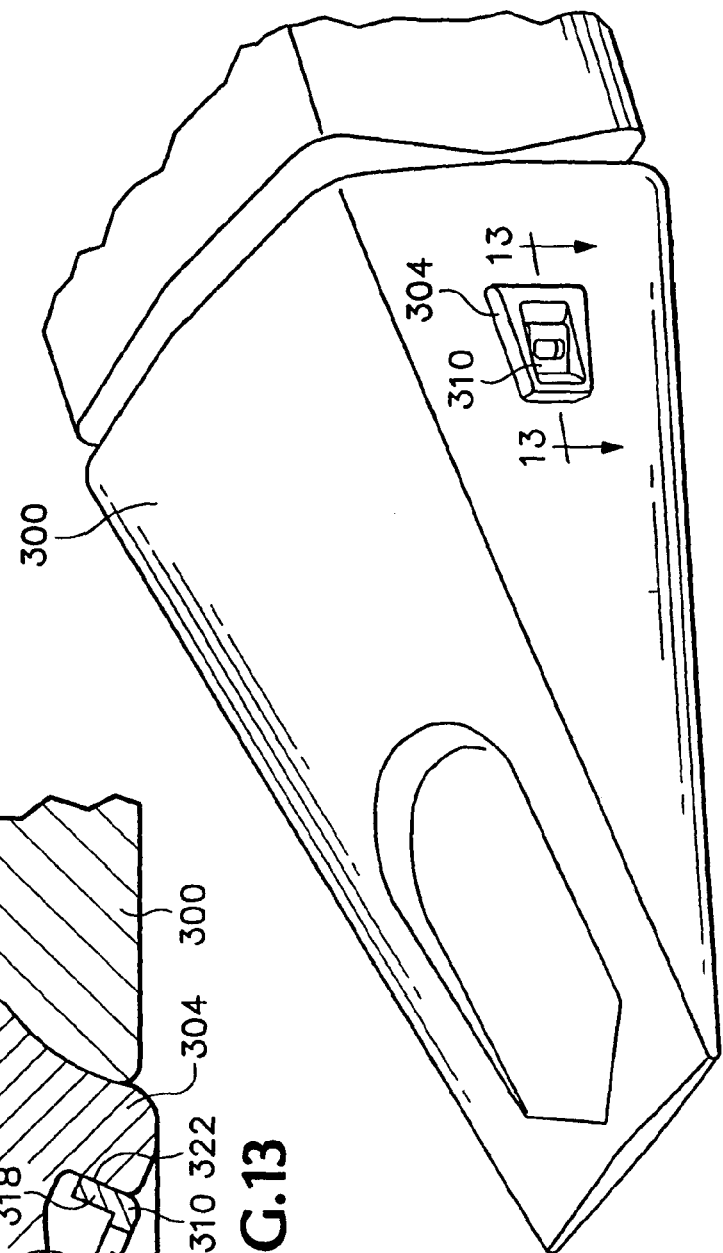
FIG. 12 is a perspective view of the assembled tooth system of FIG. 11.

The embodiment of FIGS. 11–13 has the same advantage as the other lock embodiments in that the lock body 304 may be removed without the need to displace a significant amount of soil fines. The lock body 304 is removed from the opening 306 by prying the lock body so as to pivot the lock body out of the opening. The path of removal of the lock body does not require any movement or displacement of soil fines within the opening.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A lock assembly for an excavating bucket comprising:
  (a) a wear member, a base member adapted to receive and mount the wear member, and a lock to releasably hold the wear member to the base member;
  (b) said wear member being movable longitudinally with respect to the base member into coupling engagement therewith, and said wear member and said base member having respective engaging surfaces to resist transverse movement of said wear member with respect to the base member when said wear member and said base member are in coupling engagement;
  (c) said wear member and said base member each having a lock-engaging wall, and said wear member defining an opening between said lock-engaging wall of said wear member and said lock-engaging wall of said base member, said lock being receivable through said opening when said wear member and said base member are in said coupling engagement to resist relative longitudinal movement of said wear member to said base member;
  (d) said lock comprising a lock body and a retainer, said lock body defining a channel extending through the lock body and defining a first opening in a side of said lock body;
  (e) said retainer being receivable at least partially within said channel, so that a portion of said retainer is selectively extensible from the first opening to an interfering position beyond said side so as to interfere with removal of said lock body from said opening; and
  (f) said channel defining a second opening in the lock body separate from said first opening, said retainer being accessible by a user via said second opening to be moved internally of said lock body in a direction toward said second opening so as to retract said portion of said retainer from said interfering position when said first member and said second member are in said coupling engagement.

2. A lock assembly in accordance with claim 1 wherein said retainer and said lock body are removable as a unit from said wear member and said base member through said opening in said wear member when said wear member and said base member are in said coupling engagement.

3. The lock assembly of claim 1 wherein said retainer is removable through said opening without concurrent removal of said lock body therefrom.

4. The lock assembly of claim 1 wherein said lock body is removable through said opening in said wear member along a path that does not require significant displacement of soil fines to remove said lock body from said opening in said wear member.

5. The lock assembly of claim 1 wherein said lock body substantially fills said opening in said second wear member.

6. A lock, comprising:
  (a) a rigid, substantially incompressible lock body selectively receivable into a member to be locked, said lock body defining an external opening and a pair of channels communicating internally with said external opening and having outer ends separate from said external opening communicating with opposite sides of said lock body;
  (b) a retainer receivable through said external opening having a hinge portion at least partially receivable within said external opening and a pair of legs, each receivable within a respective one of said pair of channels and selectively extensible and retractable with respect thereto so that a portion of said retainer is selectively extensible to an interfering position beyond a respective one of said opposite sides of said lock body so as to interfere with removal of said lock body from said member; and (c) said retainer being movable internally of said lock body in a direction toward said external opening so as to retract said portion of said retainer from said interfering position when said lock body is within said member.

7. A lock, comprising:

(a) a rigid, substantially incompressible lock body selectively receivable into a member to be locked, said lock body defining an external opening and a pair of channels communicating internally with said opening and with opposite sides of said lock body (b) a retainer receivable through said external opening, said retainer having a hinge portion at least partially receivable within said external opening and a pair of legs, each receivable within a respective one of said pair of channels and selectively extensible and retractable with respect thereto to an interfering position beyond a respective one of said opposite sides of said lock body so as to interfere with removal of said lock body from said member; and (c) said portion of said retainer being retractable from said interfering position in response to a pulling force exerted on said portion of said retainer through said external opening when said lock body is within said member.

8. A lock assembly for excavating equipment comprising:

a base member adapted to be fixed to the excavating equipment a wear member adapted to be received over the base member for mounting to the excavating equipment the wear member including a hole; and a lock received into the hole in the wear member to releasably hold the wear member to the base member, the lock including a body having a channel formed with two open ends, and a retainer movably received in the channel between a retaining position and a release position, the retainer having a first portion that projects out of a first of the open ends of the body to prevent release of the lock from the hole and a second portion accessible by a user via a second of the open ends to move the retainer to the release position wherein the first portion is retracted to permit removal of the lock from the hole in the wear member.

9. A lock assembly in accordance with claim 8 wherein the lock further includes a take-up member to tighten the fit of the wear member on the base member.

10. A lock assembly in accordance with claim 8 wherein the wear member moves along an axis to mount on the wear member, and wherein take-up member applies pressure in the axial direction.

11. A lock assembly in accordance with claim 10 wherein the lock body includes a third open end, and wherein the retainer includes a third portion that projects from the third open end in the retaining position to further prevent the lock from being removed from the hole in the wear member.

12. A lock assembly in accordance with claim 8 wherein the lock body includes a third open end, and wherein the retainer includes a third portion that projects from the third open end in the retaining position to further prevent the lock from being removed from the hole in the wear member.

* * * * *